United States Patent
Griseri et al.

(10) Patent No.: US 7,038,842 B2
(45) Date of Patent: *May 2, 2006

(54) REDUCED FOUR-WAVE MIXING AND RAMAN AMPLIFICATION ARCHITECTURE

(75) Inventors: Enrico Griseri, Mondovi (IT); Fabrizio Forghieri, Modena (IT)

(73) Assignee: Cisco Technology, Inc., San Jose, CA (US)

( * ) Notice: Subject to any disclaimer, the term of this patent is extended or adjusted under 35 U.S.C. 154(b) by 55 days.

This patent is subject to a terminal disclaimer.

(21) Appl. No.: 11/067,420

(22) Filed: Feb. 25, 2005

(65) Prior Publication Data
US 2005/0157378 A1  Jul. 21, 2005

Related U.S. Application Data

(63) Continuation of application No. 09/899,872, filed on Jul. 5, 2001, now Pat. No. 6,867,905.

(60) Provisional application No. 60/279,854, filed on Mar. 28, 2001.

(51) Int. Cl.
*H01S 3/00* (2006.01)
(52) U.S. Cl. ..................................... 359/334
(58) Field of Classification Search ............. 359/334, 359/337
See application file for complete search history.

(56) References Cited

U.S. PATENT DOCUMENTS

| | | | |
|---|---|---|---|
| 6,181,464 B1 | 1/2001 | Kidorf et al. | |
| 6,191,877 B1 | 2/2001 | Chraplyvy et al. | |
| 6,239,902 B1 | 5/2001 | Islam et al. | |
| 6,292,288 B1 | 9/2001 | Akasaka et al. | |
| 6,344,922 B1 | 2/2002 | Grubb et al. | |
| 6,356,383 B1 | 3/2002 | Cornwell et al. | |
| 6,384,963 B1 | 5/2002 | Ackerman et al. | |
| 6,417,958 B1 | 7/2002 | Du et al. | |
| 6,424,455 B1 | 7/2002 | Dmitri | |
| 6,433,921 B1 | 8/2002 | Wu et al. | |
| 6,441,950 B1 | 8/2002 | Chen et al. | |
| 6,867,905 B1 * | 3/2005 | Griseri et al. | ............... 359/334 |
| 2002/0021864 A1 | 2/2002 | Emori et al. | |
| 2002/0154389 A1 | 10/2002 | Vasilyev et al. | |

OTHER PUBLICATIONS

Lewis et al. "Gain Saturation in Silica-Fibre Raman Amplifier" Electronics letters, May 27, 1999 vol. 35, No. 11.
Aoki, Yasuhiro "Properties of Fiber Raman Amplifiers and Their Applicability to Digital Optical Communication Systems" J. Lightwave Tech. 6:7, Jul. 1998, pp. 1225-1239.
Hansen et al. "Rayleigh Scattering Limitations in Distributed Raman Pre-Amplifiers"Photonics Tech. Lett. 10:1, Jan. 1998, pp. 159-161.

(Continued)

*Primary Examiner*—Mark Hellner
(74) *Attorney, Agent, or Firm*—Aka Chan LLP

(57) ABSTRACT

Raman amplifiers with improved signal to noise ratio and four-wave mixing product suppression are provided. In one embodiment, both co-propagating and counter-propagating pump energy are employed to cause Raman amplification effects within a fiber. Improved Raman amplification performance including improved four-wave mixing product suppression facilitates longer distance transmission without regeneration of optical signals and/or denser WDM channel spacings.

15 Claims, 4 Drawing Sheets

OTHER PUBLICATIONS

M. Eiselt, et al. "Optical SNR Versus Q-Factor Improvement with Distributed Raman Amplification in Long Amplifier Chains," 2000 ECOC Proc., vol. 3 pp. 77-78.

F. Forghieri, et al. "Bandwidth of Cross Talk in Raman Amplifiers," 1994 OFC Optical Fiber Communication, Technical Digest, vol. 4 pp. 294-295.

I, Kaminow, et al. "Fiber Nonlinerities and Their Impact on Transmission Systems, " 1997 Optical Fiber Telecommunications IIIA, Chapter 8 pp. 196-264.

K. Mochizuki, "Amplified Spontaneous Raman Scattering in Fiber Raman Amplifiers , " 1986 IEEE vol. LT-4, No. 9 pp. 1328-1333.

T.N. Nielsen, et al. "3.28-Tb/s Transmission Over 3×100 KM of Nonzero-Dispersion Fiber Using Dual C- and L-Band Distributed Raman Amplification," 2000 IEEE Photonics Technology Letters, vol. 12, No. 8 pp.1079-1081.

S. Radie, et al. "Signal Impairment Due to Four-Wave Mixing In L-Band EDFAs," 1999 Proc. ECOC.

H. Suzuki, et al. "1-Tb/s (100×10 Gb/s) Super-Dense WDM Transmission with 25-GHz Channel Spacing in the Zero-Dispersion Region Employing Distributed Raman Amplification Technology," 2000 IEEE Photonics Technology Letters, vol. 12, No. 7 pp. 903-905.

* cited by examiner

REDUCED FOUR-WAVE MIXING AND RAMAN AMPLIFICATION ARCHITECTURE

STATEMENT OF RELATED APPLICATIONS

The present application claims priority from U.S. Provisional App. No. 60/279,854, entitled INTERACTION OF FOUR-WAVE MIXING AND DISTRIBUTED RAMAN ARCHITECTURE and filed on Mar.28, 2001 and is a continuation of U.S. patent application Ser. No. 09/899,872, filed Jul. 5, 2001, now U.S. Pat. No. 6,867,905, all of which are incorporated herein by reference for all purposes in their entirety.

BACKGROUND OF THE INVENTION

The present invention relates to optical communication systems and more particularly to amplification in optical communication systems.

The explosion of communication services, ranging from video teleconferencing to electronic commerce, has spawned a new era of personal and business interactions. As evident in the rapid growth of Internet traffic, consumers and businesses have embraced broadband services, viewing them as a necessity. However, this enormous growth in traffic challenges the telecommunication industry to develop technology that will greatly expand the bandwidth of existing communication systems. Further improvements in optical communications hold great promise to meet continuing demands for greater and greater bandwidth.

Wavelength Division Multiplexing (WDM) technology, in particular Dense WDM (DWDM) techniques, permits the concurrent transmission of multiple channels over a common optical fiber. The advent of Erbium Doped Fiber Amplifiers (EDFAs) has accelerated the development of WDM systems by providing a cost-effective optical amplifier that is transparent to data rate and format. An EDFA amplifies all the wavelengths simultaneously, enabling the composite optical signals to travel large distances (e.g., 600 km or greater) without regeneration.

One of the principal limitations of EDFA technology is limited bandwidth. Discrete and distributed Raman amplifiers have been developed to overcome this limitation. They provide very high gain across a wide range of wavelengths. Moreover, discrete and distributed Raman amplifiers increase the distance between optical regeneration points, while allowing closer channel spacing. The operation of Raman amplifiers involves transmitting high-power laser pump energy down a fiber. The pump energy amplifies the WDM signal.

The performance of Raman amplifiers in DWDM systems is limited by various impairments. One such impairment is four-wave mixing, a common detriment to optical communication system performance. If three wavelength components of a DWDM signal located at the optical frequencies $f_1$, $f_2$, and $f_3$ are being amplified, non-linear effects will cause generation of an undesired fourth component at $f_{fwm}=f_1+f_2-f_3$. This undesired fourth component is a four-wave mixing product. The four-wave mixing product represents a noise-like impairment that can affect reception of a WDM channel at or near $f_{fwm}$.

Suppressing the generation of four-wave mixing products has been a key concern in the design of Raman amplifiers, both discrete and distributed. In particular, the desire to limit four-wave mixing effects has led Raman amplifier designers to inject pump energy into a fiber exclusively in a counter-propagating direction relative to the propagation direction of the signal to be amplified. Unfortunately, such an approach also concentrates the amplification effects towards the end of the fiber, limiting the signal to noise ratio performance of the Raman amplifier.

What is needed are systems and methods for improving both four-wave mixing product suppression and signal to noise ratio in Raman amplifiers.

SUMMARY OF THE INVENTION

Raman amplifiers with improved signal to noise ratio and four-wave mixing product suppression are provided by virtue of one embodiment of the present invention. In one embodiment, both co-propagating and counter-propagating pump energy are employed to cause Raman amplification effects within a fiber. The resulting improved performance including improved four-wave mixing product suppression facilitates denser WDM channel spacings and/or longer distance transmission without regeneration of optical signals.

According to a first aspect of the present invention, apparatus for amplifying an optical signal includes: a fiber and an optical pump energy source disposed to inject optical pump energy into the fiber in a co-propagating direction relative to a transmission direction of an optical signal in the fiber to cause Raman amplification of the signal in accordance with a gain level. The gain level is greater than 4 dB.

According to a second aspect of the present invention, apparatus for amplifying an optical signal includes: a first optical pump energy source disposed to inject optical pump energy into a fiber in a co-propagating direction relative to a transmission direction of the optical signal to cause Raman amplification of the signal in accordance with a first gain level, and a second optical pump energy source disposed to inject optical pump energy into the fiber in a counter-propagating direction relative to the transmission direction of the optical signal to cause Raman amplification of the signal in accordance with a second gain level. The optical signal experiences a total gain level includes the first gain level and the second gain level. The first gain level is greater than 4 dB.

Further understanding of the nature and advantages of the inventions herein may be realized by reference to the remaining portions of the specification and the attached drawings.

DESCRIPTION OF SPECIFIC EMBODIMENTS

One embodiment of the present invention is directed toward a Raman amplifier configuration that employs both co-propagating and counter-propagating optical pumps. The inventors have discovered that such a configuration may achieve a better combination of four-wave mixing product suppression and amplifier output signal to noise ratio than could be achieved with prior art systems employing a counter-propagating optical pump signal alone. Previously, designers have either failed to take advantage of co-propagating pump energy or used insufficient co-propagating pump energy to realize the advantages attainable by embodiments of the present invention.

More particularly, a Raman amplifier according to the present invention employing both counter-propagating and co-propagating optical pumps may achieve greater four-wave mixing product suppression than a Raman amplifier using only a counter-propagating pump to achieve the same gain and output signal to noise ratio. Alternatively, a Raman amplifier according to the present invention may achieve a higher output signal to noise ratio than a Raman amplifier using only a counter-propagating pump to achieve the same gain and four-wave mixing product suppression.

Figure 1:
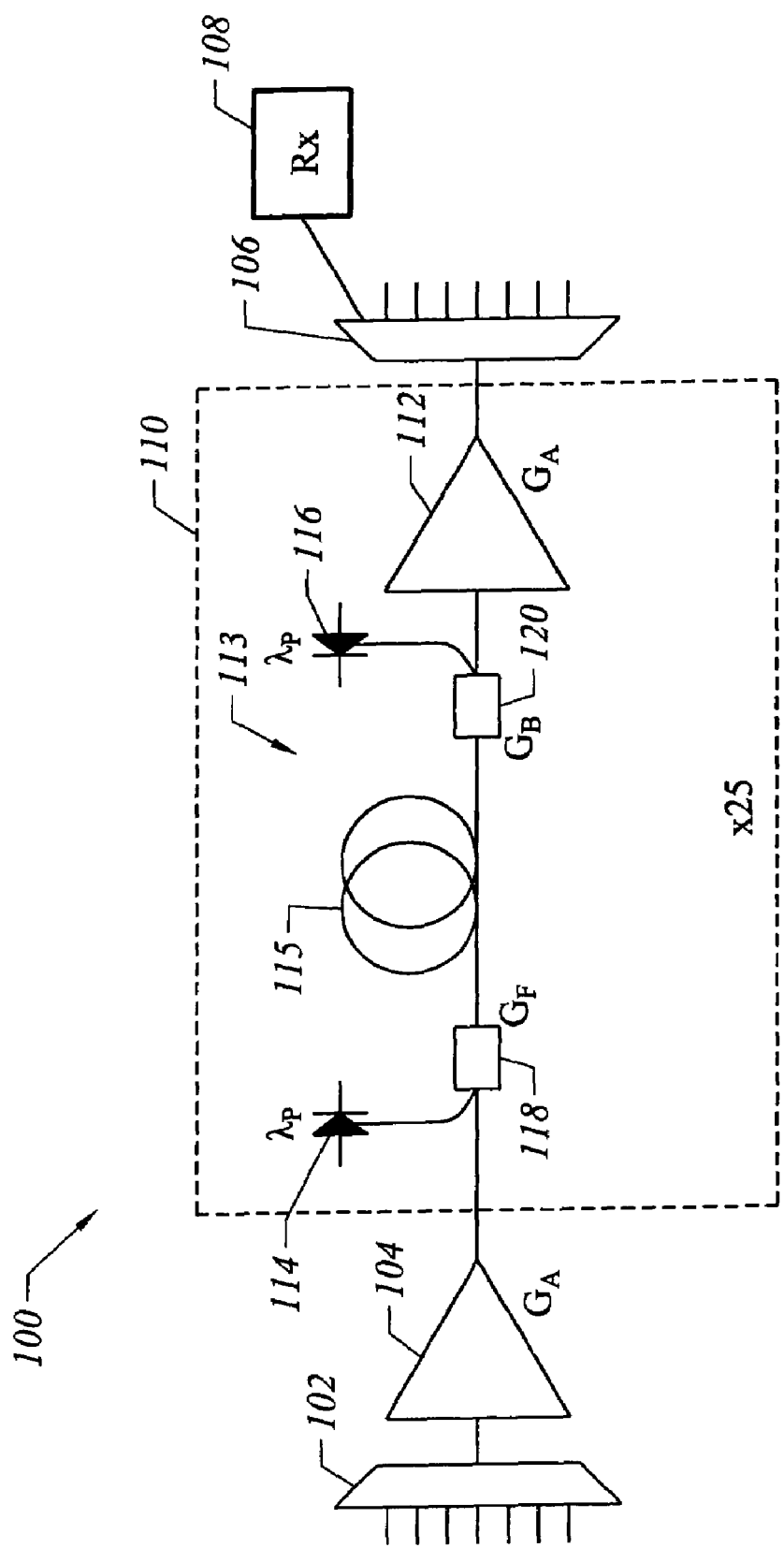
FIG. 1 depicts an optical amplification architecture according to one embodiment of the present invention.

FIG. 1 depicts an optical amplification architecture according to one embodiment of the present invention. An optical link 100 connects a WDM transmitter and a WDM receiver. Of the WDM transmitter, only a multiplexer 102 and an output erbium-doped fiber amplifier (EDFA) 104 having gain $G_A$ are depicted. Of the WDM receiver, only a demultiplexer 106 and a receiver block 108 for a single WDM channel are depicted. Further details of the WDM transmitter and WDM receiver are not germane to the present invention. Also, chromatic dispersion compensation components are omitted for ease of description and illustration.

In this example, there is no regeneration of the optical signal along the link. All amplification is purely optical. For the purpose of amplification, the link is divided into 25 spans. For ease of illustration, only a single span 110 is depicted. Typically, each of the spans incorporates similar components. In a particular example, each span represents 125 km of TW-RS™ fiber available from Lucent Technologies. Link 100 thus extends for 3125 km. Link 100 carries 32 WDM channels spaced 50 GHz apart and centered at approximately 1545 nm. The dispersion of the fiber at this wavelength is D=4.18 ps/nm/km.

The fiber of each span introduces approximately 25 dB of loss. To compensate for this loss, each span incorporates an EDFA 112 having $G_A$. In one embodiment, $G_A$=10 dB and EDFA 112 has a 7 dB noise figure. To provide the remaining needed compensation for span loss, (15 dB here) a Raman amplifier 113 is also included. Raman amplification is induced in a fiber 115 by use of both a co-propagating pump 114 and a counter-propagating pump 116. Pumps 114 and 116 are coupled into fiber 115 by couplers 118 and 120 respectively. The operation of co-propagating pump 114 gives rise to a forward Raman gain, $G_F$, while the operation of counter-propagating pump 116 gives rise to a backward Raman gain, $G_B$. The pumps emit energy at 1445 nm Methods and criteria for selecting $G_F$ and $G_B$ for optimal link operation will now be described. Performance criteria to be considered include signal to noise ratio, four-wave mixing product suppression, double Rayleigh backscattering product suppression, cross-gain modulation due to amplifier saturation, etc.

Figure 2:
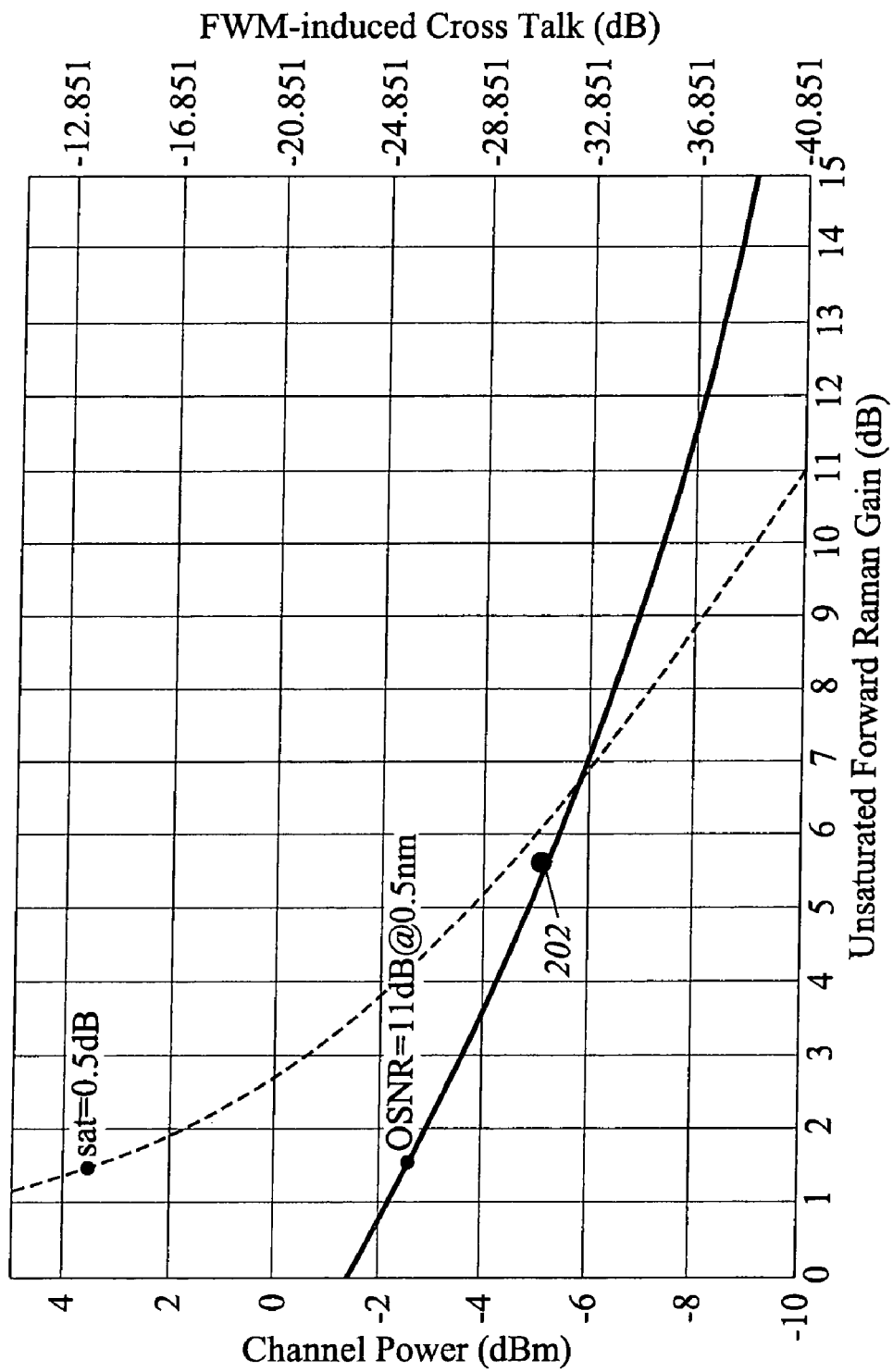
FIG. 2 depicts a first contour showing the tradeoff between per channel input power and forward Raman gain for a constant optical signal to noise ratio and a second contour showing the tradeoff between four wave mixing-induced crosstalk and forward Raman gain for a constant forward gain saturation according to one embodiment of the present invention.

FIG. 2 is a graph depicting the relationship between four-wave mixing-induced cross-talk and forward Raman gain according to one embodiment of the present invention. The following is the theoretical basis for the data determined in FIG. 2.

The four-wave mixing cross product can be expressed as:

$$X_F(L) = \frac{P_F}{P_{ch}} = \left(\gamma \frac{D_{pqr}}{3}\right)^2 P_{ch}^2 \left| \int_0^L G(\zeta) e^{i\Delta\beta\zeta} d\zeta \right|^2 \quad (1)$$

The term L refers to fiber length.
The term $P_F$ refers to the four-wave mixing product power.
The term $P_{ch}$ refers to power per channel at the fiber input.
The term $\gamma$ refers to a non-linear coefficient of the fiber, $$\gamma = \frac{2\pi\eta_2}{\lambda A_e}$$

where $\eta_2$ is the refraction index of the fiber and $A_e$ is the effective area of the fiber as explained in R. W. Tkach, and A. R. Chraplyvy, "Fiber Nonlinearities and Their Impact on Transmission Systems" in I. P. Kaminov and Thomas L. Koch, *Optical Fiber Communication IIIA*," Academic Press 1997, (hereinafter "Forghieri") the contents of which are herein incorporated by reference.

The term $D_{pqr}$ is equal to 6 for three-tone products as explained in Forghieri.

The term $G(\xi)$ refers to the gain as it has evolved at a distance $\xi$ along the fiber.

The term $\Delta\beta$ refers to the phase mismatch parameter and is defined by:

$$\Delta\beta = \beta_p + \beta_q - \beta_r - \beta_F \quad (2)$$
$$= \frac{2\pi\lambda^2}{c}(f_p - f_r)(f_q - f_r)\left[D(\lambda) - \frac{\lambda^2}{c}\left(\frac{f_p + f_q}{2} - f\right)\frac{dD}{d\lambda}\right]$$

as presented in Forghieri.

The term $\lambda$ refers to a generic wavelength. The term $f$ refers to the frequency corresponding to this generic wavelength.

The terms $f_p$, $f_q$, $f_r$ refer to the frequencies of the channels giving rise to the mixing products.

The term $D(\lambda)$ refers to chromatic dispersion at wavelength $\lambda$.

The integral in 1) can be approximated as:

$$\int_0^L G(z)\exp(i\Delta\beta z)dz \approx \frac{1 + G_F G_B \exp(-\alpha_\Lambda L)}{i\Delta\beta} \quad (3)$$

The term $\alpha_r$ refers to the fiber attenuation at the pump wavelength.

$$P_{ASE,K} = 2h\upsilon\Delta\upsilon \int_0^L r_0 N_p(\xi)\exp\left(-\alpha_s(L-\xi) + \int_\xi^L r_0 N_p(\eta)d\eta\right)d\xi. \quad (4)$$

The term hυ refers to the photon energy.

The term Δυ refers to the bandwidth over which the noise power is measured.

The term $r_0$ refers to the Raman gain coefficient of the fiber.

The pump photon number $N_p(z)$ is proportional to the pump power and, in the unsaturated gain approximation, is described by the formula:

$$N_p(z) = \frac{1}{r_0} \frac{1}{L_{eff,p}} (\ln(G_F) e^{-\alpha_p z} + \ln(G_B) e^{\alpha_F(L,z)}) \qquad (5)$$

The term $\alpha_p$ refers to the fiber attenuation at the pump wavelength.

The term $L_{eff,p}$ refers to the effective fiber length at the pump wavelength and is given by:

$$L_{eff,p} = (1 - \exp(-\alpha_p L))/\alpha_p \qquad (6)$$

$P_{ASE,EDFA}$ is the ASE generated within the EDFA and is given by:

$$P_{ASE,EDFA} = 2h\upsilon\Delta\upsilon(G_A - 1)n_{sp}. \qquad (7)$$

The term $n_{sp}$ refer to population inversion factor.

FIG. 2 is a useful tool in selecting values for $G_F$ and $G_B$. The x axis of the graph of FIG. 2 represents unsaturated forward Raman gain. The left y-scale of the graph of FIG. 2 represents input power per channel to fiber 115. The right y-scale of FIG. 2 reports the corresponding four-wave mixing-induced cross talk at the end of the whole link of 25 spans assuming that $G_B$ provides the remainder of the 15 dB that $G_F$ does not provide. To get this crosstalk, individual contributions from each span are added.

FIG. 2 assumes a dispersion value of D=4.185 ps/nm/km at the relevant wavelengths and an effective area, $A_{eff}$=55 $\mu m^2$. The data points of FIG. 2 and the relationship between channel power and four-wave mixing product suppression assume that within the 15 dB gain budgeted for Raman amplifier 113, gain not provided by the operation of the co-propagating pump ($G_F$) is provided by the counter-propagating pump ($G_B$). The four-wave mixing product has been computed according to:

$$X_F' = \frac{\langle (i_1 - \langle i_1 \rangle)^2 \rangle}{\langle i_1 \rangle^2}$$

where $i_1$ is the photodiode current corresponding to a received "1" value.

In this example, it is assumed that 0.5 dB of gain saturation, i.e., saturation effects that cause a 0.5 dB loss of gain represents a maximum tolerable level of saturation for the Raman amplifier of each span. Above this limit, cross-gain modulation causes intolerable transmission impairments in the example of FIG. 2. A dotted line represents a contour of gain/power combinations causing 0.5 dB of saturation. It is also assumed that adequate WDM receiver performance requires that the link achieve an 11 dB output optical signal to noise ratio (OSNR) as measured over a 0.5 nm bandwidth, taking into account noise introduced by all the amplifiers (both the 25 Raman amplifiers and the 26 EDFAs). The solid line is a contour representing combinations of forward gain and input power per channel that give rise to this desired OSNR at the output of Raman amplifier 113. The input power per channel is set by the EDFA preceding the Raman amplifier.

It will then be appreciated that the combination of forward Raman gain and channel power to be employed should be on the solid curve to achieve the desired OSNR while maximizing suppression of four-wave mixing products. To maintain less than 0.5 dB of saturation, the selected gain/power combination should also be to the left of the dotted line curve. One example of a gain/power combination 202 that meets these criteria is a forward gain of approximately 5.50 dB in combination with a per-channel input power of approximately −5 dBm. It will be seen that this corresponds to a four-wave mixing cross talk of approximately −31 dB. By contrast, if only the counter-propagating pump 116 were used ($G_F$=0), achieving the same gain and signal to noise ratio would mean a four-wave mixing product suppression level of only −24 dB, insufficient for correct WDM receiver operation. If only the counter-propagating pump (i.e. $G_F$=0) were used and the input channel power were set to achieve −31 dB of four-wave mixing crosstalk, an OSNR of approximately only 7.5 dB would be obtained. It has been found that forward gains of greater than 4 dB are often particularly advantageous in suppressing four-wave mixing products and achieving good OSNR performance.

Once $G_F$ has been selected, the backward gain $G_B$ is selected by subtracting $G_F$ from the gain allocated to Raman amplifier 113, e.g., 15 dB in the depicted example. The power level of pump 114 is adjusted empirically to achieve the desired $G_F$ value and the power level of pump 116 is adjusted empirically to achieve the desired $G_B$ value.

Figure 3:
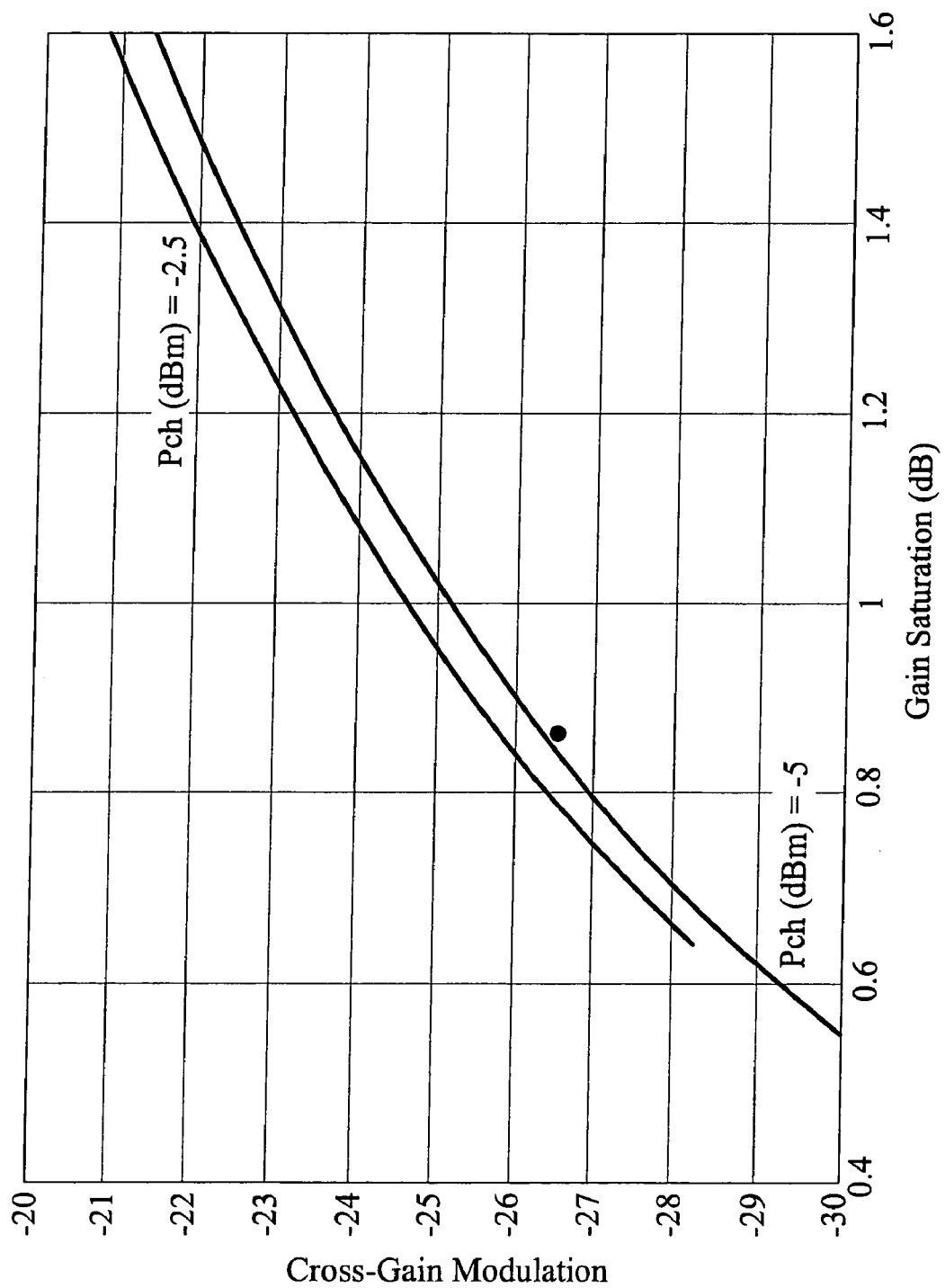
FIG. 3 is a graph depicting the relationship between cross-gain modulation and gain saturation according to one embodiment of the present invention.

FIG. 3 is a graph depicting the relationship between cross-gain modulation and gain saturation over all 25 spans according to one embodiment of the present invention. The graph assumes a typical distribution of chromatic dispersion and chromatic dispersion compensation through the link. This graph further assumes that the pumps emit energy at 1445 nm. FIG. 3 is presented to support the selection of 0.5 dB as a desired maximum saturation level. It is seen that cross-gain modulation is suppressed by 30 dB for a gain saturation of 0.5 dB and power per channel of −5 dBm. This is deemed to be sufficient suppression for typical WDM receiver operation.

Figure 4:
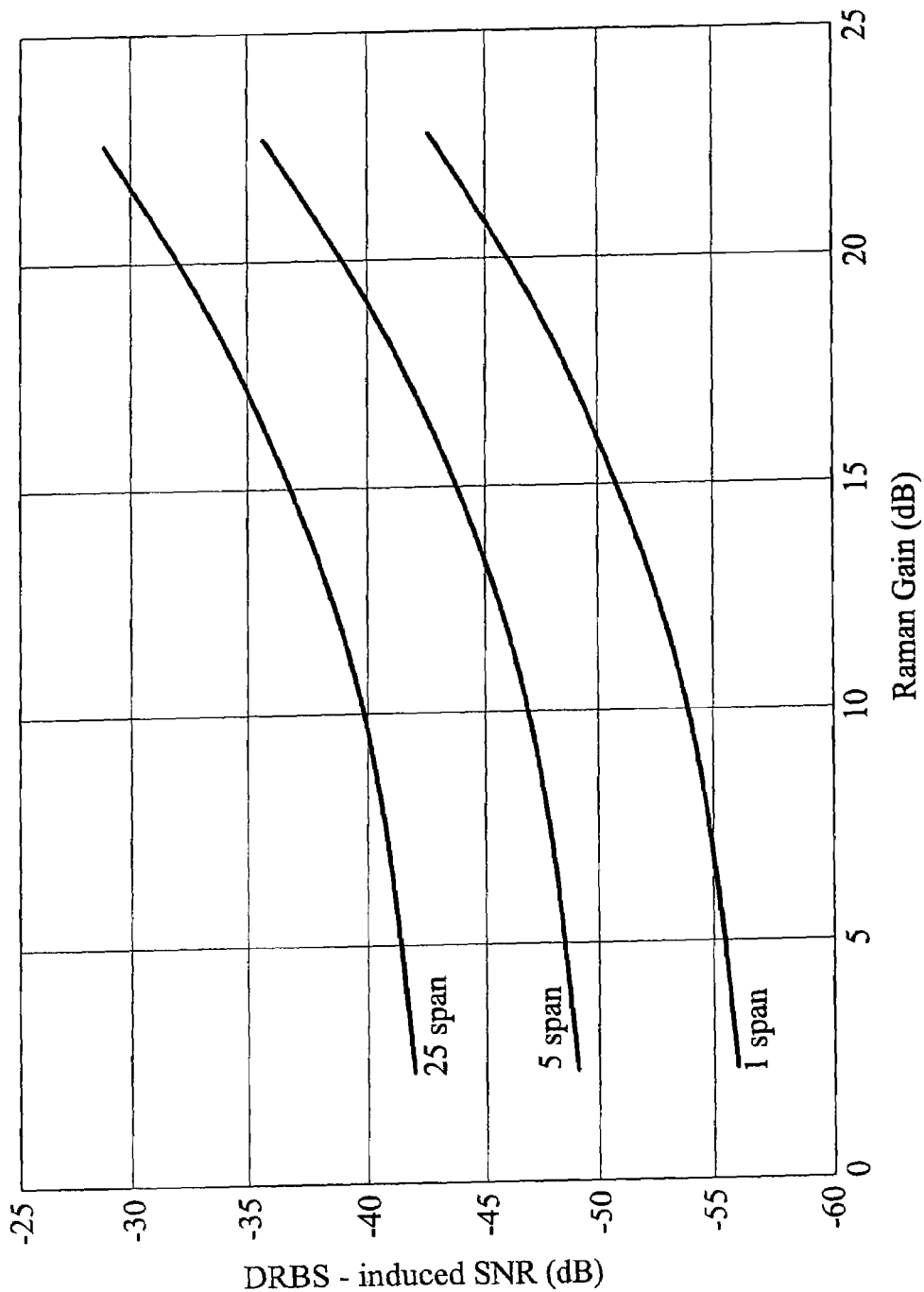
FIG. 4 is a graph depicting the relationship between double Rayleigh back-scattering and Raman gain according to one embodiment of the present invention.

Another important Raman amplifier impairment to control is double Rayleigh backscattering. FIG. 4 is a graph depicting the relationship between double Rayleigh backscattering and Raman gain according to one embodiment of the present invention. FIG. 4 assumes the use of TW-RS fiber, an effective area of 55 $\mu m^2$, a Rayleigh back-scattering coefficient of 5.25×10−8 $m^{-1}$, a pump wavelength of 1445 nm, a signal wavelength of 1545 nm.

FIG. 4 shows the Raman backscattering product caused by either the co-propagating pump or counter-propagating pump. This product is computed using the techniques disclosed in P. Hansen et al., *IEEE Photon. Tech. Lett.*, Vol. 10, No1 (1998), p. 159, the contents of which are herein incorporated by reference. To evaluate the backscattering product suppression for a given configuration of Raman amplifier 113, one separately determines the suppression levels for the forward and backward gains using the values given by FIG. 4 for the number of spans in the link. Then, the double Rayleigh back scattering noise levels contributed by the forward and backward gain are computed given the suppression levels and the signal level at the output level of Raman amplifier 113. These noise levels are added and compared to the signal level to obtain the double Rayleigh backscattering suppression level. In general, double Rayleigh backscattering suppression of greater than 30 dB is typically required. For our previous example system where $G_F$=5.5 dB and $G_B$=9.5 dB, the double Rayleigh backsckattering suppression is approximately 37.5 dB.

It will be appreciated that there are many combinations of forward gain and backward gain that will give rise to a system with adequate signal to noise ratio, four-wave mixing product suppression, double Rayleigh backscattering product suppression, cross-gain modulation product suppression, etc. The graphical methods described above are only one possible method of selecting forward and backward gain for Raman amplifier 113 according to the invention. Alternatively, one could select a combination of forward gain and backward gain based on a desired double backscattering product suppression level, four wave mixing product suppression level, and signal to noise ratio and then verify the gain saturation performance that would result from the selected gains. By employing both co-propagating and counter-propagating pump energy, Raman amplifier 113 achieves combinations of output signal to noise ratio and four-wave mixing product suppression that cannot be achieved using only counter-propagating optical energy.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents. For example, other optical components may be included between components shown as being directly connected in FIG. 1.

The invention claimed is:

1. In an optical communication system, apparatus for amplifying an optical signal, said apparatus comprising:
    a fiber; and
    an optical pump energy source disposed to inject optical pump energy into said fiber in a co-propagating direction relative to a transmission direction of an optical signal in said fiber to cause Raman amplification of said signal in accordance with a gain level greater than 4 dB;
    wherein either 1) for a selected signal to noise ratio, there is a greater four-wave mixing product suppression level than would be achieved using only a counter-propagating optical pump energy source to obtain said gain level or 2) for a selected four-wave mixing product suppression level, there is a higher signal to noise ratio than would be achieved using only said counter-propagating energy source to obtain said gain level.

2. In an optical communication system, apparatus for amplifying an optical signal, said apparatus comprising:
    a first optical pump energy source disposed to inject optical pump energy into a fiber in a co-propagating direction relative to a transmission direction of said optical signal to cause Raman amplification of said signal in accordance with a first gain level;
    a second optical pump energy source disposed to inject optical pump energy into said fiber in a counter-propagating direction relative to said transmission direction of said optical signal to cause Raman amplification of said signal in accordance with a second gain level, said optical signal experiencing a total gain level including said first gain level greater than 4 dB and said second gain level; and
    wherein either 1) for a selected signal to noise ratio, there is a greater four-wave mixing product suppression level than would be achieved using only said second optical pump energy source to obtain said total gain level or 2) for a selected four-wave mixing product suppression level, there is a higher signal to noise ratio than would be achieved using only said second optical pump energy source to obtain said total gain level.

3. The apparatus of claim 2 wherein said second gain level is set responsive to said first gain level and said total gain level.

4. The apparatus of claim 2 wherein said first gain level and said second gain level are set responsive to a desired maximum double Rayleigh scattering level.

5. The apparatus of claim 2 wherein a power level of said first optical pump energy source is set responsive to said first gain level.

6. The apparatus of claim 2 wherein a power level of said second optical pump energy source is set responsive to said second gain level.

7. The apparatus of claim 2 further comprising said fiber.

8. The apparatus of claim 2 further comprising:
    an Erbium-doped fiber amplifier in cascade with said fiber.

9. In an optical communication system, apparatus for amplifying an optical signal, said apparatus comprising:
    a first optical pump energy source disposed to inject optical pump energy into a fiber in a co-propagating direction relative to a transmission direction of said optical signal to cause Raman amplification of said signal in accordance with a first gain level greater than 4 dB; and
    a second optical pump energy source disposed to inject optical pump energy into said fiber in a counter-propagating direction relative to said transmission direction of said optical signal to cause Raman amplification of said signal in accordance with a second gain level;
    wherein either for a selected gain saturation level, said first optical pump energy source has a power level set to achieve one of a desired gain saturation level or a desired Rayleigh backscattering level, and said second optical pump energy source has a power level set to obtain a desired gain level given said power level set for said first optical pump energy source; and
    wherein either 1) for a selected signal to noise ratio, there is a greater four-wave mixing product suppression level than would be achieved using only said second optical pump energy source to obtain said total gain level or 2) for a selected four-wave mixing product suppression level, there is a higher signal to noise ratio than would be achieved using only said second optical pump energy source to obtain said total gain level.

10. The apparatus of claim 9 further comprising said fiber.

11. The apparatus of claim 10 further comprising an Erbium-doped fiber amplifier in cascade with said fiber.

12. In an optical communication system, a method for amplifying an optical signal within a fiber by exploiting Raman effects to achieve a desired gain level, said method comprising:
    injecting co-propagating optical pump energy into said fiber to cause Raman amplification according to a first gain level greater than 4 dB;
    injecting counter-propagating optical pump energy into said fiber to cause Raman amplification according to a second gain level; and
    wherein either 1) for a selected signal to noise ratio at an output of said fiber, there is a greater four-wave mixing product suppression level than would be achieved injecting only said counter-propagating optical pump energy to obtain said desired gain level or 2) for a selected four-wave mixing product level, there is a higher signal to noise ratio than would be achieved using injecting only said counter-propagating optical energy to obtain said desired gain level.

13. The method of claim 12 further comprising:
further amplifying said signal within an Erbium-doped fiber amplifier.

14. In an optical communication system, apparatus for amplifying an optical signal within a fiber by exploiting Raman effects to achieve a desired gain level, said apparatus comprising:
  means for injecting co-propagating optical pump energy into said fiber to cause Raman amplification according to a first gain level greater than 4 dB;
  means for injecting counter-propagating optical pump energy into said fiber to cause Raman amplification according to a second gain level; and
  wherein either 1) for a selected signal to noise ratio at an output of said fiber, there is a greater four-wave mixing product suppression level than would be achieved injecting only said counter-propagating optical pump energy to obtain said desired gain level or 2) for a selected four-wave mixing product level, there is a higher signal to noise ratio than would be achieved injecting only counter-propagating optical energy to obtain said desired gain level.

15. The apparatus of claim 14 further comprising:
means for further amplifying said signal within an Erbium-doped fiber amplifier.

* * * * *